United States Patent [19]

Webber et al.

[11] Patent Number: 4,501,191

[45] Date of Patent: Feb. 26, 1985

[54] POWER ASSISTED STEERING GEAR

[75] Inventors: Gordon E. G. Webber; Alan G. Wilson, both of Bristol, England

[73] Assignee: Cam Gears Limited, Hertfordshire, England

[21] Appl. No.: 496,943

[22] Filed: May 23, 1983

[30] Foreign Application Priority Data

Jun. 18, 1982 [GB] United Kingdom ............... 8217632

[51] Int. Cl.³ ............................................. F15B 13/16
[52] U.S. Cl. .................................. 91/375 A; 180/148;
137/454.6; 137/625.24
[58] Field of Search .................. 91/375 A, 375 R, 462;
137/454.6, 625.24; 180/147, 148

[56] References Cited

FOREIGN PATENT DOCUMENTS

| 42731 | 4/1979 | Japan | 91/375 A |
| 2043566 | 10/1980 | United Kingdom | 91/375 A |
| 2044701 | 10/1980 | United Kingdom | 91/375 A |

*Primary Examiner*—Paul E. Maslousky
*Attorney, Agent, or Firm*—Yount & Tarolli

[57] ABSTRACT

A power assisted steering gear has a toothed part 1 such as a pinion coupled through a torque responsive rod 12 to an input shaft 4 so that rotation of the shaft 4 rotates the pinion 1 to drive an output member having a servo motor associated therewith. Fluid flow to the servo motor for power assistance is controlled by the valve 6 by displacement of component parts of the valve during relative rotation between the input shaft 4 and the pinion 1 as permitted by the rod 12.

The valve 6 and pinion 1 form a unified assembly 7 carried on the shaft 4 and which is inserted into and removed from the housing 3 (by way of a side port 15) in unit manner. The assembly 7 is retained in the housing 3 solely by means, such as a spring clip 25, which is readily accessible from the exterior of the housing.

The unified assembly 7 is rotatably borne in the housing by bearings 16 and 17 which may form part of the assembly for removal therewith or be retained within the housing following removal of the unified assembly. The bearing 16 journals a shaft part 19 formed by an extension of the rod 12 through the pinion 1.

22 Claims, 3 Drawing Figures

POWER ASSISTED STEERING GEAR

TECHNICAL FIELD AND BACKGROUND ART

This invention relates to a power assisted steering gear and is particularly concerned with such a gear having a toothed part which is coupled to an axially extending input shaft and which is rotatably mounted for driving an output member in response to rotation of the input shaft about its axis. In such a gear the toothed part is usually in the form of a pinion or worm rotation of which drives a toothed rack member or toothed sector member which comprises, or is coupled to, the output member. Conventionally a servo motor is associated with the output member to provide power assistance to displacement of that member and the flow of fluid under pressure to the servo motor is controlled by a valve which reacts between the toothed part and the input shaft and is responsive to rotation of the input shaft. Typically the valve and toothed part of a power assisted steering gear are operatively mounted in a cavity formed by a steering gear housing with the input shaft extending from a side of the housing for connection, usually, to a steering column. It has hitherto been proposed with such a typical arrangement for the toothed part and the valve to be locatable in, and removable from, the cavity by way of a side port in the housing and for the toothed part and valve to be operatively coupled together following the insertion of the latter of these components in the cavity. Generally the toothed part is inserted first into the cavity for engagement with a further toothed part where it is rotatably mounted and retained, such retention being by means of spring clips, thrust bearings or the like. Subsequent to the retention of the toothed part in the cavity, the valve is inserted to operatively engage with the toothed part and to be rotationally mounted and retained in the cavity (the retaining of the valve again being effected by the use of thrust bearings, retaining clips, caps or plates which may close the cavity). The assembly of such a prior proposal in piecemeal manner and likewise the dis-assembly of the gear for servicing or replacement of the components is often inconvenient and time consuming (particularly where the toothed part has to be removed from the cavity and it is necessary first to re-move the valve part and thereafter to remove the retaining means for the toothed part which means is generally regarded as somewhat inaccessible and awkward to engage within the cavity). It is an object of the present invention to provide a power assisted steering gear which comprises a toothed part and a valve mounted in a cavity of a gear housing and which gear facilitates assembly and dis-assembly of the valve and toothed part components with the cavity of the housing and alleviates the disadvantages as previously described of the prior proposals.

STATEMENT OF INVENTION AND ADVANTAGES

According to the present invention there is provided a power assisted steering gear comprising a toothed part coupled to an axially extending input shaft and rotatably mounted for driving an output member in response to rotation of the input shaft about its axis; valve means reacting between said toothed part and the input shaft, said valve means being responsive to rotation of the input shaft for controlling the flow of fluid under pressure to a servo motor associated with the output member to provide power assistance to displacement of that member; a gear housing within a cavity of which said toothed part and valve means are mounted, said toothed part and valve means being locatable in and removable from the cavity by way of a side port in the housing, and wherein the toothed part and valve means comprise a unified assembly carried by the input shaft for insertion into and withdrawal from the cavity axially and as a unit by way of said side port, and removable retaining means is provided for retaining said unified assembly in the cavity, said retaining means being located in the region of said side port to be accessible from the exterior of the housing and to be removable while the unified assembly is within said cavity.

The invention envisages therefore the possibility of having the toothed part and valve means as a unified assembly which can be inserted into and removed from the cavity of the gear housing in unit manner; furthermore, the unified assembly when located in the cavity is intended to be retained therein simply by retaining means which may be readily accessible from the exterior of the housing. This proposal therefore lends itself to a relatively fast and simple removal of the toothed part and valve means as a unit from the housing for servicing or replacement purposes following which service the assembly, or a replacement assembly, may be inserted into the cavity and retained therein by a single retaining means located in the region of the side port to the cavity to be readily accessible from the exterior of the housing. Therefore there is avoided the necessity of dis-assembling the valve means and toothed part for their removal piecemeal from the housing and also of having to remove retaining means which may be awkwardly located within the cavity with regard to the accessibility of that retaining means through the side port of the cavity.

As previously mentioned, the toothed part will usually be in the form of a pinion or worm the teeth of which are in driving engagement, within the gear housing, with a rack member or toothed sector which constitutes, or is coupled to, the output member to be driven in response to rotation of the input shaft.

Generally it is envisaged that the valve means and toothed part will be disposed axially in tandem, usually co-axially, and during insertion of the unified assembly into the cavity through the side port the toothed part preferably leads the valve means (although the possibility of the reverse tandem arrangement is envisaged).

The toothed part and valve means are unlikely to be of the same external diameter and to maintain a compact gear the cavity may be wholly or partially formed from a stepped axially extending bore the larger diameter bore part of which is located adjacent to the side port while one of the toothed part and valve means is located in the larger diameter bore part and the other is located in the smaller diameter bore part. Bearing in mind the preference for the toothed part to lead the valve means during insertion of the unified assembly into the cavity it is preferred that the toothed part is located in the smaller diameter bore part.

The unified assembly will be rotatably borne in the housing and preferably there are first and second axially spaced bearing means, the first bearing means rotatably mounting the toothed part in the housing and the second bearing means rotatably mounting the valve means in the housing. One or both of these bearing means may comprise a plain bearing but usually the bearing means will be formed with rolling bearing elements. The bearing means, or one or more of such means, may be arranged to form part of the unified assembly so that that bearing means is withdrawable from the cavity in unit manner with the assembly and is similarly inserted into the cavity. Alternatively, or in addition, one or more of the bearing means may be mounted in the cavity to rotatably accommodate the unified assembly during insertion of the assembly into the cavity and that bearing means can be arranged to be retained in the cavity following withdrawal of the unified assembly therefrom. The basic structure and operation of the valve means which forms part of the unified assembly may be of a type which is conventional for power assisted steering gears whereby the input shaft and toothed part of the unified assembly are capable of restricted rotation about the shaft axis relative to each other and are rotationally biased relative to each other to oppose such restricted rotation and to a neutral condition of the valve means. With this arrangement the valve means may comprise first and second valve parts which are displaceable with respect to each other and in response to the aforementioned rotational displacement between the input shaft and the toothed part to control fluid flow through the valve means. The first and second valve parts can be displaceable with respect to each other axially and/or rotationally and with the latter form of rotational displacement one of the valve parts will usually rotate in unison with the toothed part while the other rotates in unison with the input shaft. The rotational biasing between the input shaft and the toothed part will usually be provided by a resilient axially extending torque responsive rod which is coupled at one end region for rotation with the input shaft and at the other end region for rotation with the toothed part in a manner well known in the power assisted steering gear art. A preferred feature of the present invention however is that the toothed part is tubular and the aforementioned torque responsive rod extends co-axially therethrough. With such an arrangement an end of the rod can project axially from the toothed part on the side thereof remote from the valve means so that this end provides a journal by which the toothed part end of the unified assembly is rotatably borne in the housing. With this preferred arrangement the journal end of the torque responsive rod may lead, sequentially, the toothed part and valve means during insertion of the unified assembly into the cavity of the housing so that the journal end of the rod engages within a bearing mounted in, or in an extension of, the cavity when the unified assembly is correctly housed within the cavity.

DRAWINGS

One embodiment of a power assisted steering gear, constructed in accordance with the present invention will now be described, by way of example only, with reference to the accompanying illustrative drawings, in which:

FIG. 1 is an axial section through a preferred form of the gear illustrating the unified assembly of the toothed part and valve means and from which, for convenience, the output member (which may be driven directly or indirectly by rotation of the toothed part) together with other components conventionally associated with a power assisted steering gear have been omitted, and FIGS. 2 and 3 show modifications of the gear in FIG. 1 in similar sections to that in FIG. 1.

DETAILED DESCRIPTION OF DRAWINGS

Figure 1:
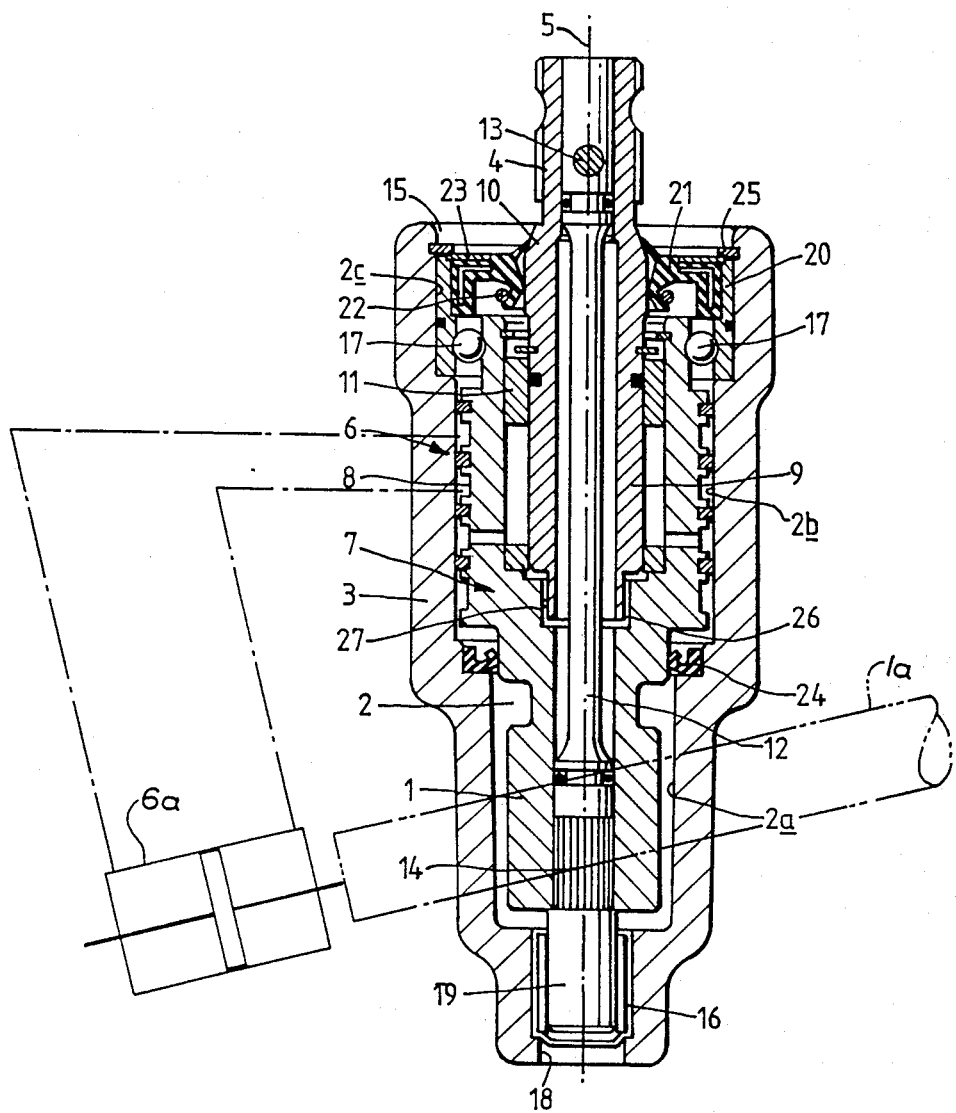

The steering gear to which the drawings apply is of the rack and pinion type and has a pinion 1 rotatably mounted in a cavity 2 of a gear housing 3. The pinion 1 is rotated in response to rotation of an input shaft 4 about its axis 5 and with which input shaft the pinion 1 is co-axial. The teeth of the pinion 1 engage within the housing 3 with the teeth of a rack bar 1a (shown schematically in the drawings) which conveniently provides an output member of the steering gear and is displaceable longitudinally to effect a steering manoeuvre in response to rotation of the pinion.

The rack bar has associated therewith a servo motor 6a (such as a double acting piston and cylinder device (shown schematically) fluid pressure flow to which is intended to provide power assistance to displacement of the rack bar in the direction in which that bar is displaced by rotation of the pinion 1. The arrangement of the rack bar within the housing 3 and with respect to the pinion 1 and also the construction and arrangement of the servo motor may be conventional for power assisted steering gears and as such need not be discussed further.

Provided between the pinion 1 and the input shaft 4 is a fluid control valve 6 for controlling the flow of pressurised fluid to and from the aforementioned servo motor. The valve 6 is mounted within the cavity 2 and in accordance with the present invention forms a unified assembly 7 with the pinion 1 which assembly 7 is carried by the input shaft 4.

In constructing the unified assembly 7 of FIG. 1, the valve 6 has a valve sleeve 8 which extends co-axially from and is integral with the pinion 1. Co-axially received within the valve sleeve 8 is a valve core 9 formed on a tubular extension 10 of the input shaft 4. Interposed between the core 9 and valve sleeve 8 is a ported sleeve 11 within the bore of which the valve core 9 is slidably received and which ported sleeve 11 is secured relative to the valve sleeve 8. Extending axially through the unified assembly 7 is a torque responsive rod 12 which is coupled at one end region by a pin 13 to the input shaft 4 for rotation with that shaft and is coupled at its other end region by co-operating splines 14 to the pinion 1 for rotation with the pinion.

For convenience the porting and passage arrangements for fluid flow control within the valve 6 have been omitted, suffice it to say that these arrangements may be of a type which is conventional for power assisted steering gears incorporating valves in which relative rotation between valve components from a neutral condition of the valve causes an adjustment in the porting to provide the required fluid flow to the servo motor associated with the output member for the power assistance to be applied. In the present embodiment adjustment of the porting in the valve 6 is effected by relative rotation between the valve core 9 and the combined valve sleeves 8 and 11. To provide such adjustment in the porting as aforementioned, when the input shaft 4 is rotated in response to a steering input, if the rack bar is under load (so that the pinion 1 is restrained from rotating, through the rod 12, in unison with the input shaft) the resilience of the rod 12 and the torsional forces to which it is subjected between the input shaft and the pinion causes the rod 12 to twist and this to be reflected in relative rotation between the valve core 9 and the valve sleeves 8, 11 to provide the required fluid flow control in conventional manner.

To maintain the gear of a compact nature, the cavity 2 within which the unified assembly 7 is mounted has a stepped bore within a smaller diameter bore part 2a of which is received the pinion 1 and within the larger diameter bore part 2b of which is received the valve 6. The external cylindrical face of the valve sleeve 8 is received as a close sliding and sealed fit within the bore part 2b and this bore part opens into a further enlarged bore part 2c which communicates with a side port 15 in the housing 3 (from which side port the input shaft 4 extends).

The unified assembly 7 is rotatably mounted within the housing 3 by a needle roller bearing 16 and a ball roller bearing 17. The needle bearing 16 is mounted in a bore 18 extending from the cavity 2 and a shaft part 19 extending axially from the pinion 1 is journalled therein. The shaft part 19 is formed by an end of the rod 12 which projects through the tubular pinion 1 as shown. The ball bearing 17 has an inner race formed by part of the valve sleeve 8 and an outer race formed by a bearing sleeve 20 which is non-rotatably received within the bore part 2c of the housing. Mounted within the outer race sleeve 20 and secured relative thereto is an annular fluid seal 21 extending between that race and the tubular input shaft part 10. The seal 21 slidably engages the shaft part 10 to permit relative axial rotation therebetween and is retained in fluid sealing engagement with the shaft part by a light annular spring 22. The seal 21 is retained by an annular closure plate 23 mounted on a rebated end of the bearing sleeve 20 and through which plate 23 the input shaft 4 projects from the housing 3 for connection to a steering column.

An annular fluid seal 24 seated in the shoulder formed between the larger and smaller cavity bore parts 2a and 2b slidably engages the unified assembly 7 to provide a seal between the cavity part within which the pinion is located and that within which the valve is located.

The unified assembly 7 which, in the present example includes the ball bearing 17 and its outer race sleeve 20, is retained within the cavity 2 solely by means of a "C" shaped spring clip 25 which is removably received within an annular recess in the bore part 2c and within the side port 15 to be readily accessible from the exterior of the gear housing. The clip 25 abuts and retains the plate 23 and bearing race sleeve 20 to secure the latter sleeve against an annular shoulder formed between the bore parts 2b and 2c (this retention of the sleeve 20 conveniently determines the axial location of the unified assembly 7 within the housing 3).

Removal of the unified assembly 7 from the housing 3 for servicing or replacement purposes can be effected in a most simple and convenient manner by disengaging the clip 25 and withdrawing the assembly as a unit (including the sleeve 20) from the cavity 2 axially through the side port 15. During this removal the needle bearing 16 and seal 24 are retained in their respective seatings within the housing 3 but can be subsequently replaced, if necessary. The unified assembly after servicing (or another assembly with different characteristics for the valve and/or pinion) is easily and simply positioned within the gear by insertion through the side port 15 with the journalled shaft 19 leading, sequentially, the pinion 1 and valve 6 until the shaft 19 engages within the needle bearing 16, the bearing race 20 is correctly seated within the bore part 2c and the retaining clip 25 can be fitted to secure the assembly 7 within the housing.

In accordance with conventional practice the unified assembly includes a fail-safe arrangement which permits manual operation of the gear in the event of a malfunction in the power assistance facility. This fail-safe arrangement is provided by the end 26 of the tubular input shaft which is adjacent to the pinion 1 having an external profile which is other than cylindrical, for example substantially rectangular, and being received, with clearance, within a socket 27 of the pinion. The socket 27 is also of non-cylindrical profile, for example rectangular. The clearance between the parts 26 and 27 is such that it permits limited relative rotation between the input shaft part 10 and the valve sleeve 8 for the required operation of the valve 6 but, in the event of power assistance malfunction, the parts 26 and 27 move into abutment with each other during relative rotation between the shaft 10 and sleeve 8 for the pinion to be rotated directly and in unison with the input shaft 4.

Figure 2:
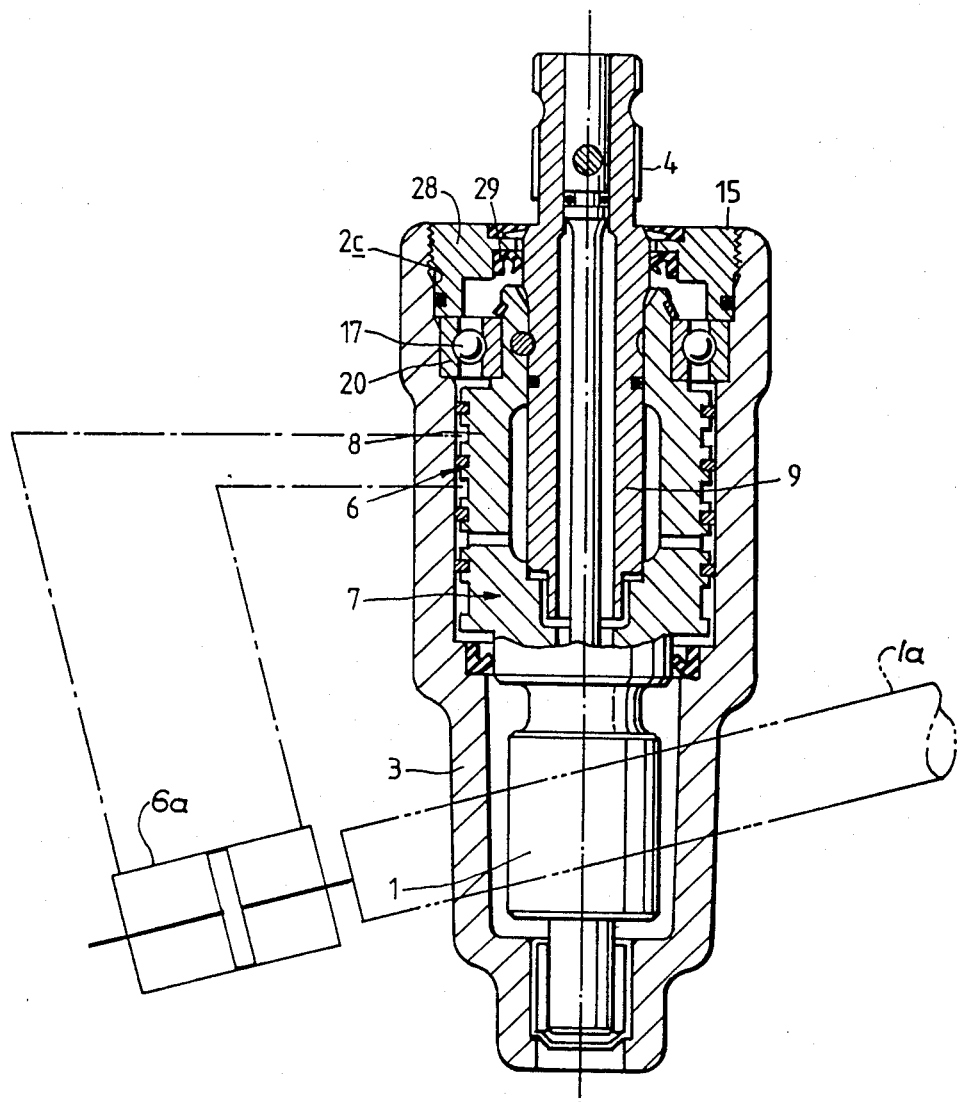

By the modification shown in FIG. 2 the sleeve 20 forming the outer race of the ball bearing 17 is retained (and thereby the unified assembly 7 is retained) axially within the housing 3 solely by a closure cap 28 which screw threadedly engages, within the side port 15, in the bore part 2c. The cap 28 carries an annular seal 29 within which the input shaft 4 is slidably received.

A further modification of FIG. 2 is that the ported sleeve 11 of FIG. 1 has been omitted and the valve sleeve 8 which is integral with the pinion 1 co-operates directly with the valve core 9 to provide the porting and fluid flow characteristics required of the valve.

Figure 3:
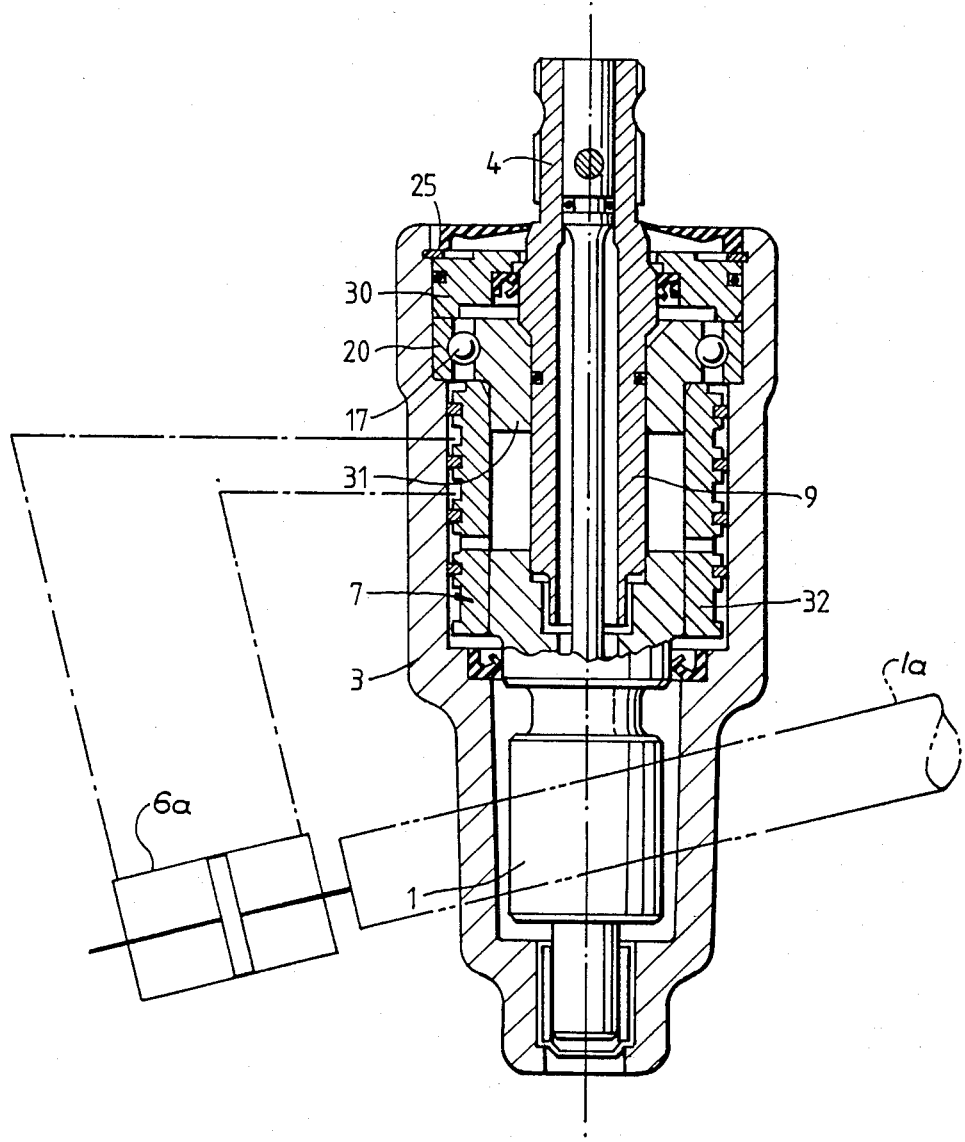

In the modification shown in FIG. 3 the unified assembly 7 is secured in the housing 3 by a spring clip 25 similarly to the FIG. 1 arrangement but in this case the clip 25 retains the outer race sleeve 20 of the roller bearing 17 by abutment through a sealed retaining plate 30. FIG. 3 also shows a modification whereby the valve sleeve which rotates in unison with the pinion 1 is of a two part structure comprising an inner ported sleeve part 31 which is integral with the pinion and outer sleeve part 32 within which the inner sleeve 31 is received and secured for rotation therewith.

We claim:

1. A power assisted steering gear comprising a housing defining a chamber and having an opening therein at one side thereof, an input shaft extending into said chamber through said opening, a toothed part rotatably mounted in said chamber for driving an output member in response to rotation of said input shaft, said input shaft and said toothed part being capable of restricted rotation relative to each other, valve means located in said chamber and responsive to relative rotation of said input shaft and toothed part for controlling fluid flow to a servo motor associated with said output member to provide power assistance to movement thereof, means attaching said valve means and said toothed part and said input shaft to form in a single unitary assembly for insertion into said chamber through said opening as a unitary assembly and for removal from said chamber through said opening as a unitary assembly, a single retaining means for retaining said unitary assembly in said chamber and preventing removal thereof from said chamber through said opening, said single retaining means being located at said one side and comprising a releasable means releasable to allow for removal of said unitary assembly through said opening.

2. A gear as claimed in claim 1 in which the toothed part and valve means are disposed axially in tandem so that during insertion of the unitary assembly into the chamber the toothed part leads the valve means.

3. A gear as claimed in claim 1 in which the chamber comprises a stepped axially extending bore the larger diameter bore part of which is located adjacent to the one side, one of the toothed part and valve means being located in the larger diameter bore part and the other being located in the smaller diameter bore part.

4. A gear as claimed in claim 3 in which the toothed part and valve means are disposed axially in tandem and the toothed part is located in the smaller diameter bore part.

5. A gear as claimed in claim 3 and comprising a fluid seal between the unitary assembly and the housing, said seal being seated in an annular shoulder formed between said stepped diameter bore parts.

6. A gear as claimed in claim 1
further comprising first and second axially spaced bearing means, said first and second bearing means rotatably mounting the toothed part and the valve means in the housing.

7. A gear as claimed in claim 6 in which at least one of said first and second bearing means is mounted in the housing to rotatably accommodate the unitary assembly during insertion of the assembly into the chamber and that said at least one bearing means is retained in the chamber following withdrawal of the unitary assembly therefrom.

8. A gear as claimed in claim 7 in which the toothed part and valve means are disposed axially in tandem so that during insertion of the unitary assembly through the one side the toothed part leads the valve means and wherein the first bearing means is mounted in the chamber to rotatably support the toothed part as the unitary assembly is inserted into the chamber.

9. A gear as claimed in claim 8 in which the toothed part comprises a bearing shaft extending from the side thereof axially remote from the valve means and which bearing shaft is journalled in the first bearing means.

10. A gear as claimed in claim 6 in which the second bearing means is part of the unitary assembly.

11. A gear as claimed in claim 10 wherein said second bearing means is received between an annular shoulder provided on the housing and said retaining means to thereby prevent axial displacement of the unitary assembly in the housing.

12. A gear as claimed in claim 1 in which the retaining means comprises a closure cap or plate removably retained on the housing and having an aperture through which the input shaft extends.

13. A gear as claimed in claim 12 in which the retaining means comprises a closure cap screw threadedly engaged with the housing.

14. A gear as claimed in claim 12 in which the retaining means comprises a closure plate and a spring clip which engages with the housing to retain said plate.

15. A gear as claimed in claim 1 in which the input shaft and toothed part of the unitary assembly are capable of restricted rotation about the shaft axis relative to each other and are rotationally biased relative to each other to oppose said restricted rotation and to a neutral condition of the valve means and wherein the valve means comprises first and second valve parts which are displaceable with respect to each other and in response to said rotational displacement between the input shaft and the toothed part to control fluid flow through the valve means.

16. A gear as claimed in claim 15 in which the first and second valve parts are rotationally displaceable, one in unison with the toothed part and the other in unison with the input shaft.

17. A gear as claimed in claim 16 in which the first and second valve parts comprise a valve core and a valve sleeve within which the core is rotatably received.

18. A gear as claimed in claim 17 in which the valve sleeve is integral with the toothed part.

19. A gear as claimed in claim 15 in which the means attaching the valve means, the toothed part and the input shaft comprises a resilient axially extending torque responsive rod coupled at one end region for rotation with the input shaft and at the other end region for rotation with the toothed part, said rod providing for rotational biasing between the input shaft and the toothed part.

20. A gear as claimed in claim 19 comprising first and second axially spaced bearing means, said first and second bearing means rotatably mounting the toothed part and the valve means in the housing, said toothed part and valve means being disposed axially in tandem so that during insertion of the unitary assembly through the one side the toothed part leads the valve means, said toothed part being tubular and the torque responsive rod extending coaxially therethrough, an end of said rod projecting axially from the toothed part on the side thereof axially remote from the valve means, said end providing a journal by which the toothed part end of the unitary assembly is rotatably borne by the first bearing means.

21. A gear as claimed in claim 1 in which the toothed part comprises a pinion.

22. A gear as claimed in claim 1 wherein said releasable means is removably received in said housing.

* * * * *